United States Patent [19]
Takase et al.

[11] Patent Number: 5,581,400
[45] Date of Patent: Dec. 3, 1996

[54] FINDER OPTICAL SYSTEM WITH LOW-HYGROSCOPIC ORGANIC MATERIAL

[75] Inventors: Hiroshi Takase, Hachioji; Tatsuru Kanamori, Hanno; Masaki Imaizumi; Masaru Morooka, both of Hachioji, all of Japan

[73] Assignee: Olympus Optical Co., Ltd., Tokyo, Japan

[21] Appl. No.: 335,352

[22] Filed: Nov. 3, 1994

[30] Foreign Application Priority Data

Nov. 5, 1993 [JP] Japan .................................. 5-277032

[51] Int. Cl.⁶ .............. G03B 13/08; G02B 3/00; G02B 23/00
[52] U.S. Cl. .............. 359/431; 359/362; 359/642; 396/378; 396/386
[58] Field of Search .................... 359/362, 421–423, 359/431–435, 652, 654, 207, 462, 717; 354/219–225

[56] References Cited

U.S. PATENT DOCUMENTS

| 4,535,026 | 8/1985 | Yoldas et al. ................. 359/654 |
| 4,779,969 | 10/1988 | Sato et al. ................... 359/422 |
| 4,895,433 | 1/1990 | Takahashi et al. ............. 359/654 |
| 5,144,349 | 9/1992 | Kato et al. ................... 354/222 |
| 5,251,069 | 10/1993 | Iizuka ......................... 359/717 |

FOREIGN PATENT DOCUMENTS

| 3181908 | 8/1991 | Japan . |
| 4349418 | 12/1992 | Japan . |
| 324260 | 11/1994 | Japan . |

*Primary Examiner*—Thong Nguyen
*Attorney, Agent, or Firm*—Cushman, Darby & Cushman

[57] ABSTRACT

A finder optical system including an objective system, an image erecting system for erecting an object image formed by the objective system, and an eyepiece system for observing the object image. These systems are constructed of low-hygroscopic organic materials. Thus, the finder optical system can prevent transient variations of optical properties caused by hygroscopicity.

10 Claims, 13 Drawing Sheets

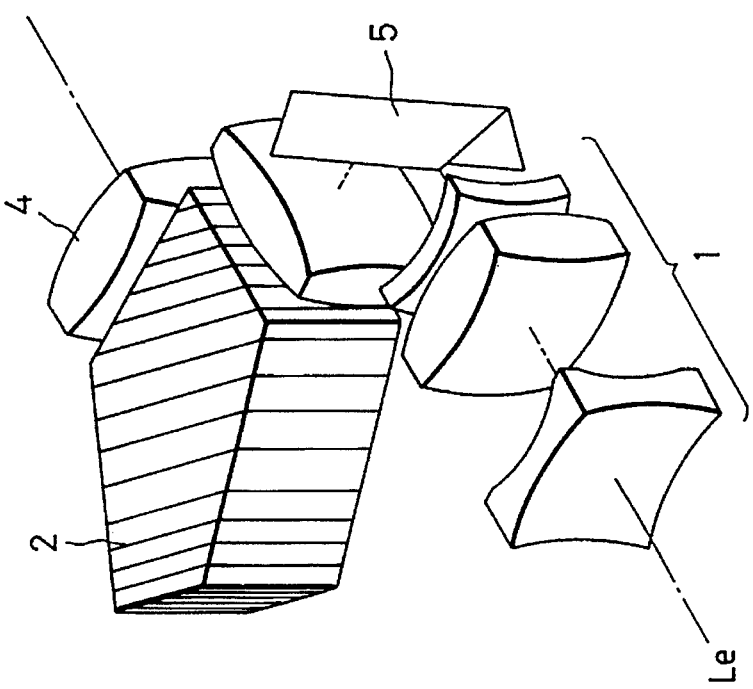
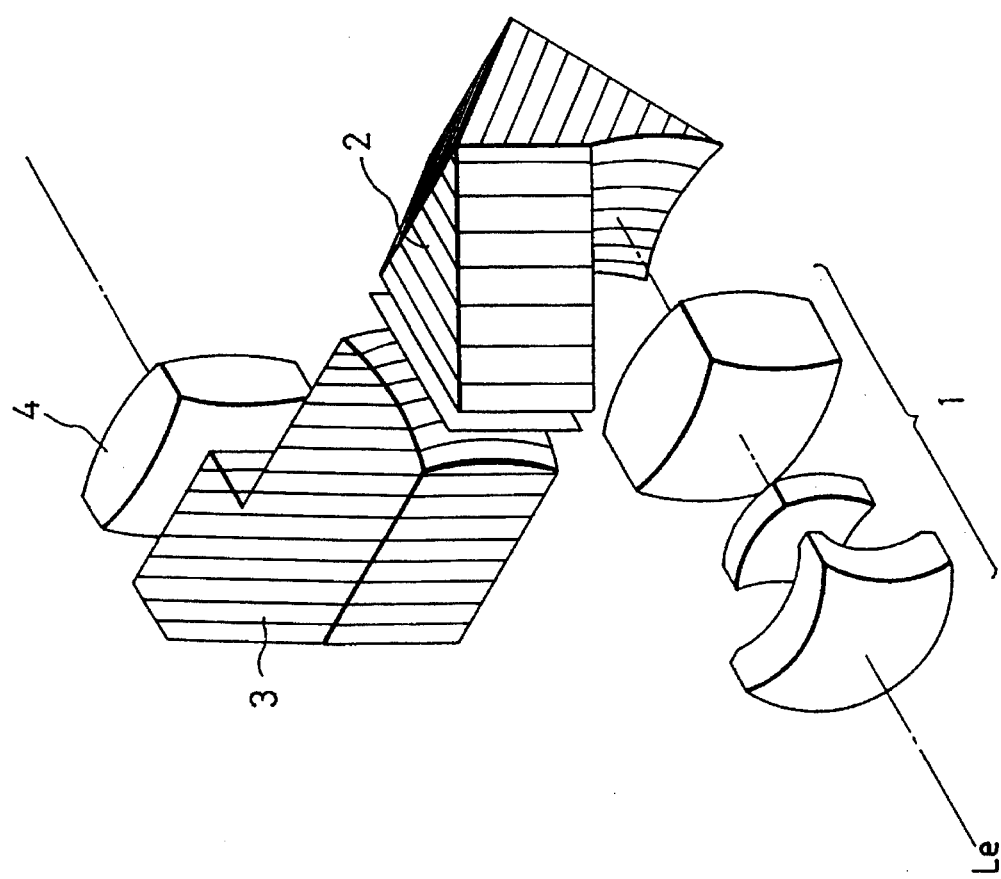

SPHERICAL ABERRATION
PUPIL DIA. = 2.0mm

-1.0   1.0
(diop)

ASTIGMATISM
$\omega = 27.9°$

-1.0   1.0
(diop)

DISTORTION
$\omega = 27.9°$

-10.   10.
(%)

SPHERICAL ABERRATION
PUPIL DIA. = 2.0mm

-1.0   1.0
(diop)

ASTIGMATISM
$\omega = 14.8°$

-1.0   1.0
(diop)

DISTORTION
$\omega = 14.8°$

-10.   10.
(%)

SPHERICAL ABERRATION
PUPIL DIA. = 2.0mm

-1.0   1.0
(diop)

ASTIGMATISM
$\omega = 7.6°$

-1.0   1.0
(diop)

DISTORTION
$\omega = 7.6°$

-10.   10.
(%)

SPHERICAL ABERRATION
PUPIL DIA. = 2.0mm

-1.0   1.0
(diop)

ASTIGMATISM
ω = 27.9°

-1.0   1.0
(diop)

DISTORTION
ω = 27.9°

-10.   10.
(%)

SPHERICAL ABERRATION
PUPIL DIA. = 2.0mm

-1.0   1.0
(diop)

ASTIGMATISM
ω = 20.8°

-1.0   1.0
(diop)

DISTORTION
ω = 20.8°

-10.   10.
(%)

SPHERICAL ABERRATION
PUPIL DIA. = 2.0mm

-1.0   1.0
(diop)

ASTIGMATISM
ω = 14.8°

-1.0   1.0
(diop)

DISTORTION
ω = 14.8°

-10.   10.
(%)

SPHERICAL ABERRATION
PUPIL DIA. = 2.0mm

−1.0   1.0
(diop)

CURVATURE OF FIELD
ω = 34.22°

−1.0   1.0
(diop)

DISTORTION
ω = 34.22°

−10.   10.
(%)

SPHERICAL ABERRATION
PUPIL DIA. = 2.0mm

−1.0   1.0
(diop)

CURVATURE OF FIELD
ω = 21.23°

−1.0   1.0
(diop)

DISTORTION
ω = 21.23°

−10.   10.
(%)

SPHERICAL ABERRATION
PUPIL DIA. = 2.0mm

−1.0   1.0
(diop)

CURVATURE OF FIELD
ω = 13.11°

−1.0   1.0
(diop)

DISTORTION
ω = 13.11°

−10.   10.
(%)

SPHERICAL ABERRATION
PUPIL DIA. = 2.0mm

-1.0  1.0
(diop)

CURVATURE OF FIELD
ω = 29.85°

-1.0  1.0
(diop)

DISTORTION
ω = 29.85°

-10.  10.
(%)

SPHERICAL ABERRATION
PUPIL DIA. = 2.0mm

-1.0  1.0
(diop)

CURVATURE OF FIELD
ω = 18.58°

-1.0  1.0
(diop)

DISTORTION
ω = 18.58°

-10.  10.
(%)

SPHERICAL ABERRATION
PUPIL DIA. = 2.0mm

-1.0  1.0
(diop)

CURVATURE OF FIELD
ω = 11.53°

-1.0  1.0
(diop)

DISTORTION
ω = 11.53°

-10.  10.
(%)

SPHERICAL ABERRATION
PUPIL DIA. = 2.0mm
−1.0　1.0
(diop)

CURVATURE OF FIELD
ω = 26.3°
−1.0　1.0
(diop)

DISTORTION
ω = 26.3°
−10.　10.
(%)

FINDER OPTICAL SYSTEM WITH LOW-HYGROSCOPIC ORGANIC MATERIAL

BACKGROUND OF THE INVENTION

1. Field of the Invention

This invention relates to an optical system for observing an object image with the eye, used in finder systems of cameras for photography with silver halide, electronic photographing cameras, and in binoculars.

2. Description of the Related Art

Where organic materials are used in an optical system, it is generally known that water vapor is absorbed from the atmosphere into the optical system or moisture is discharged therefrom, thereby bringing about changes in refractive indices and dimensions of lenses to vary optical properties. As a provision for this problem, it is known, as disclosed by Japanese Patent Preliminary Publication No. Hei 3-181908, that optical elements constructed of organic materials are arranged inside lens barrels and the outermost lens elements coming in contact with the atmosphere are made from inorganic materials (although these materials are merely described as nonhygroscopic materials, they correspond to optical glass in view of the optical properties of the embodiments) so that inner humidity is held to the same state as in the case where the optical system is assembled with covers, and thereby the optical properties are constantly maintained without undergoing the influence of a humidity change of the atmosphere.

Further, as disclosed by Japanese Patent Preliminary Publication No. Hei 4-349418, it is known that thermoplastic resin with norbornane structure is used for at least one element of an objective lens to prevent the degradation of optical properties which are attributable to lens deformation due to hygroscopicity. Still further, as set forth in Japanese Patent Application No. Hei 5-113197 filed by the same applicant as in the present application, it is also known that the lenses of a focus detecting device are constructed of some material which is small in linear hygroscopic expansion coefficient (for example, polyolefin resin) to prevent the deterioration of focus detecting performance which is due to changes in refractive index and shape accompanied by the variation of humidity.

However, the above-mentioned prior art of Publication No. Hei 3-181908, which needs optical parts used as the covers, causes an increase in the number of parts. Moreover, since the encasement of movable lens units does not allow the operation of the movable lens units to be smoothly performed because of the effect such as that in an air pump, the optical parts serving as the covers, two for each movable unit, must be arranged. This causes a further increase in the number of parts constituting the optical system, and makes it practically impossible to apply the prior art to the optical system including a variable magnification section.

On the other hand, in the above-mentioned prior art of Publication No. Hei 4-349418 and Application No. Hei 5-113197, it is described that, on the assumption that the changes of refractive index and shape caused by hygroscopicity are homogeneously produced, low hygroscopic materials are used for lens elements which are easily influenced by the changes and have powers from the first. A change in homogeneity, however, occurs in the saturated state of hygroscopicity, and for practical use, the refractive index existing close to the surface of a lens will differ from that at the center thereof so that what is called inhomogeneous distribution is produced. In this case, even with optical elements having no power from the first, the power by index distribution will be generated. When hygroscopicity is saturated and homogenized, the optical elements will return to the state where they have little power.

However, none of the prior art recognizes the presence of the above problems, not to speak of the technique of diminishing such transient variations of characteristics.

SUMMARY OF THE INVENTION

It is, therefore, an object of the present invention to provide a finder optical system with low-hygroscopic organic material in which the constituent members of the optical system are constructed of proper low-hygroscopic organic materials in order to lessen transient variations of characteristics caused by hygroscopicities of the constituent members.

In order to achieve this object, the finder optical system with low-hygroscopic organic material according to the present invention includes, in order from the object side, an objective system, an image erecting system for erecting an image of an object formed by the objective system, and an eyepiece system for conducting the image to an eyepoint so that the image can be observed with an observer's eye. The finder optical system is constructed with members using low-hygroscopic organic materials.

Further, the finder optical system according to the present invention is such that low-hygroscopic organic materials are used for lenses each having a relatively large thickness at the middle and aspect ratios varying with the position of a section perpendicular to the optical axis, prisms each having a relatively great optical path length and aspect ratios varying with the position of a section perpendicular to the optical axis, and optical elements in which a part of the interface of each element is covered with a coating or paint.

This and other objects as well as the features and advantages of the present invention will become apparent from the following detailed description of the preferred embodiments when taken in conjunction with the accompanying drawings.

BRIEF DESCRIPTION OF THE DRAWINGS

FIG. 3 is a view showing the arrangement of the optical system of a first embodiment in the present invention;

FIG. 8 is a view showing the arrangement of the optical system of a second embodiment in the present invention;

DETAILED DESCRIPTION OF THE PREFERRED EMBODIMENTS

Figure 1:
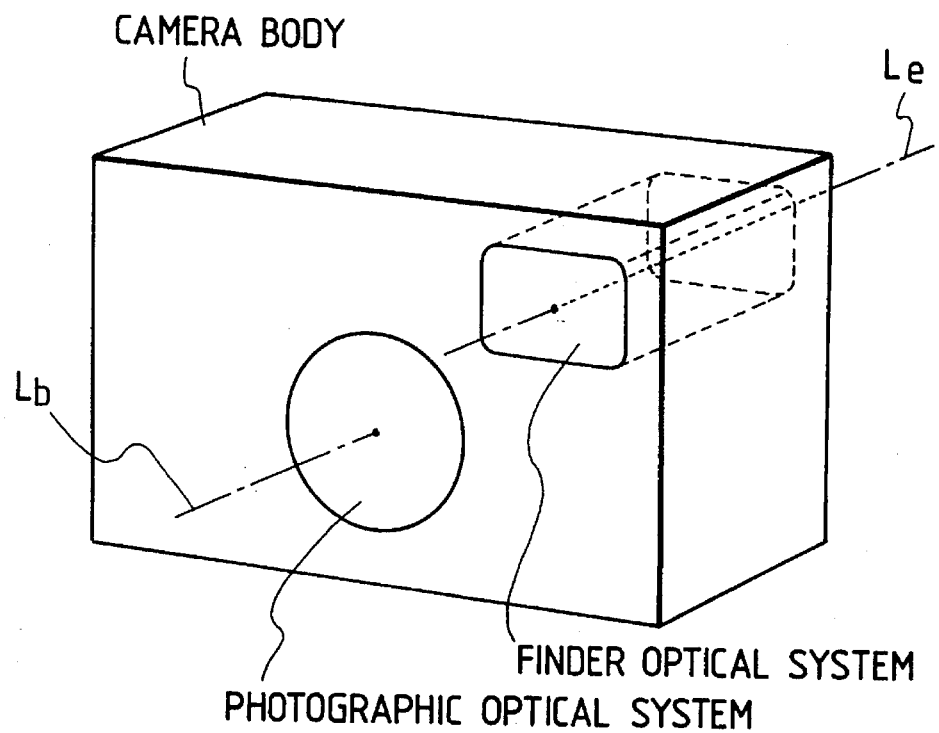
FIG. 1 is a view showing a camera in which a finder optical system according to the present invention is disposed independent of a photographic optical system.

The effects of index distribution on the powers of optical elements are as follows:

(1) The gradient of refractive index in the direction of the optical axis has little effect on the power.

(2) The greater the gradient of refractive index in the direction perpendicular to the optical axis, the higher the power.

(3) The gradient of refractive index in the direction inclined with respect to the optical axis influences the power in a compromise state between items (1) and (2).

(4) The larger the thickness of a medium through which a ray of light passes, the higher the power.

(5) If a change is produced in the gradient of refractive index in the direction making a right angle with the optical axis, the power will vary with azimuth and astigmatism will be generated on the optical axis.

Additionally, in the state where the gradient of refractive index is formed, it may be said that (6) as the intersection of the optical axis with a perpendicular from the surface of a lens coming in contact with the outside atmosphere is separated from the vertex of the lens, the gradient of refractive index varies.

Thus, it is considered from the above optical properties that optical elements having the following aspects becomes remarkable for the production of the power, based on the index distribution, and the variation of the aspect ratio of an image plane at the center.

(1) An optical element having a great length along the optical axis on the ground of item (4).

(b) An optical system in which the area of the outer surface of the optical element such as that in item (2) cannot be disregarded with respect to an optical surface such as entrance and exit surfaces following item (1) or a reflecting surface following item (3).

(c) An optical element in which the shape of a section perpendicular to the optical axis following item (6) deviates considerably from an isotropic one, for example, sectional aspect ratios vary very greatly.

(d) An element in which a part of the interface is covered with a coating or paint and deviation is caused to an area or direction referring to hygroscopicity.

Hence, when low hygroscopic materials are used for the optical elements having the above aspects, the transient variations of optical properties caused by hygroscopicity can be lessened. If organic materials are in particular used as the low hygroscopic materials, the construction of the optical system can be facilitated, and a reduction in manufacturing cost and a lightweight design of the optical system can be achieved at the same time. Consequently, the optical system has high quality and becomes easy to use.

In order to especially increase the effect of the optical system of the present invention, it is desirable that the low-hygroscopic organic material satisfies the condition:

$$-5.00\times10^{-6}/\% \leq \alpha \leq 5.00\times10^{-6}/\%$$

where $\alpha$ is a linear hygroscopic expansion coefficient relative to a change per unit percentage of humidity of the optical system. For the low-hygroscopic organic material satisfying this condition, it is desirable to use polyolefin resin (for example, ZEONEX by Nippon Zeon Co., Ltd.).

Figure 2:
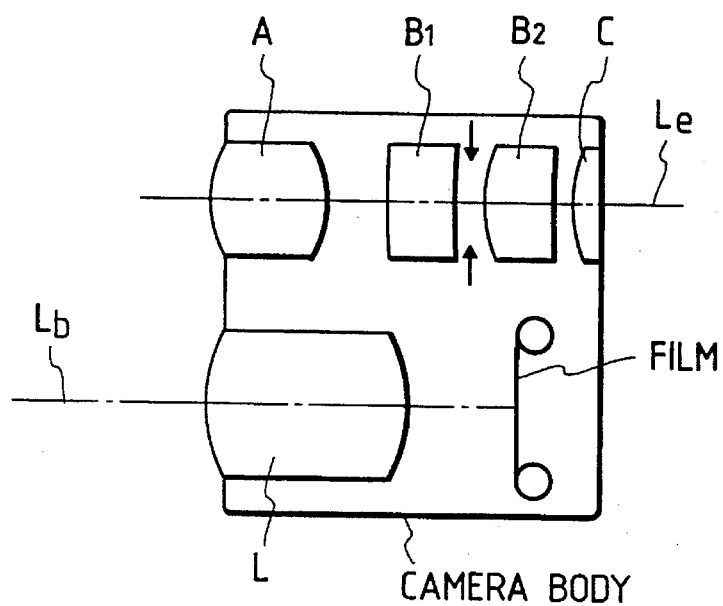
FIG. 2 is a sectional view of the camera shown in FIG. 1.

The finder optical system of the present invention, as shown in FIG. 1, is constructed independent of a photographic optical system. Specifically, as depicted in FIG. 2, a finder optical path $L_e$ is disposed separate from a photographic optical path $L_b$. In the figure, reference symbol A represents a finder objective lens, $B_1$ and $B_2$ represent prisms, C represents an eyepiece, and L represents a photographic objective lens.

In accordance with the embodiments shown, the present invention will be explained in detail below.

Figure 4A:
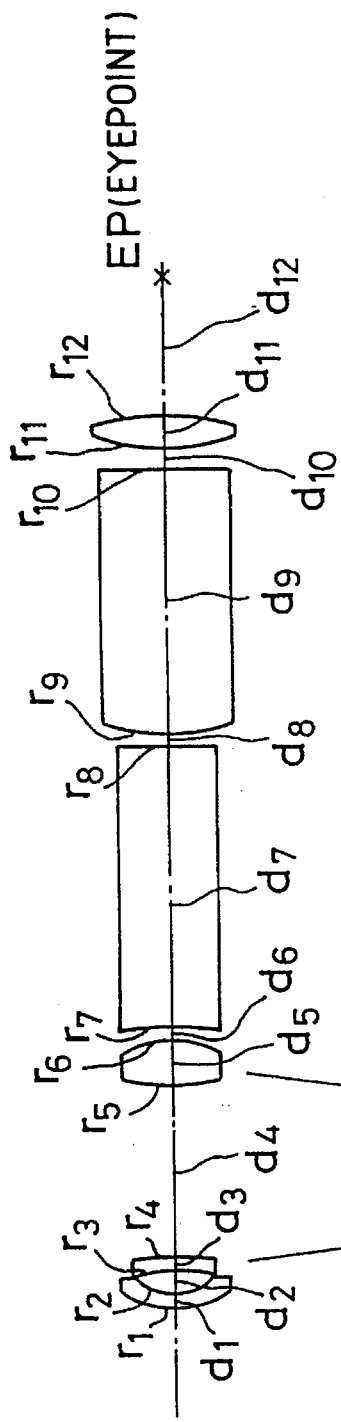
FIGS. 4A, 4B, and 4C are sectional views showing configurations of the optical system of the first embodiment developed along the optical axis at low, moderate, and high magnification positions, respectively.
Figure 4B:
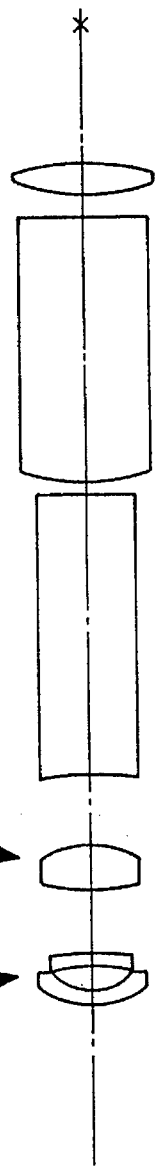
Figure 4C:
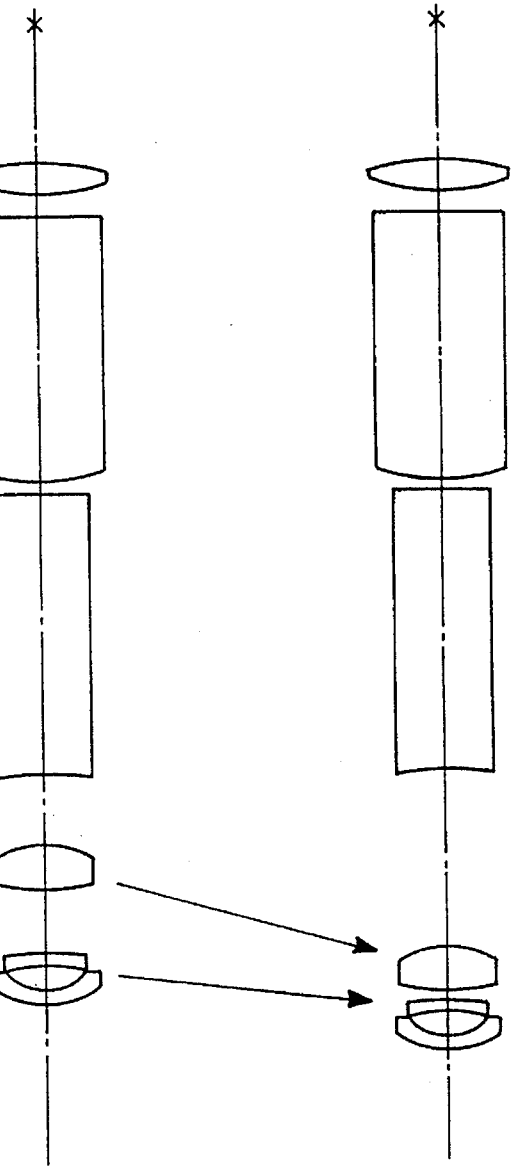
Figure 5A:
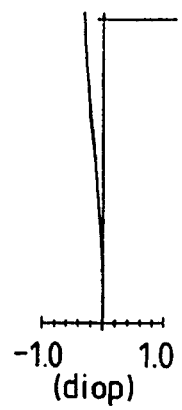
FIGS. 5A, 5B, and 5C are diagrams showing characteristics of spherical aberration, astigmatism, and distortion, respectively, at the low magnification position in the optical system of the first embodiment.
Figure 5B:
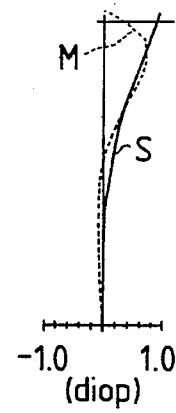
Figure 5C:
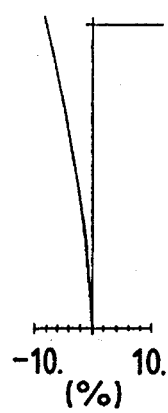
Figure 6A:
FIGS. 6A, 6B, and 6C are diagrams showing characteristics of spherical aberration, astigmatism, and distortion, respectively, at the moderate magnification position in the optical system of the first embodiment.
Figure 6B:
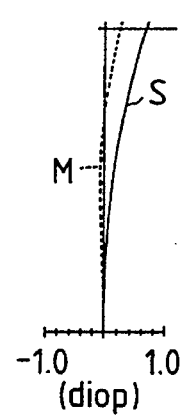
Figure 6C:
Figure 7A:
FIGS. 7A, 7B, and 7C are diagrams showing characteristics of spherical aberration, astigmatism, and distortion, respectively, at the high magnification position in the optical system of the first embodiment.
Figure 7B:
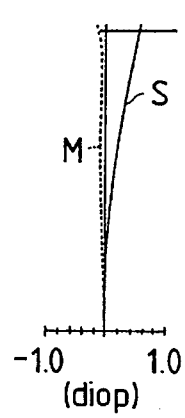
Figure 7C:
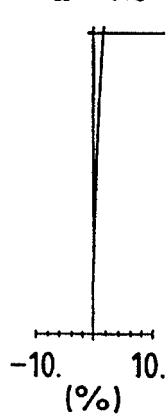

FIG. 3 shows the lens arrangement of the optical system of the first embodiment in the present invention. FIGS. 4A–4C show configurations, at low, moderate, and high magnification positions, respectively, developed along the optical axis of the optical system in FIG. 3. FIGS. 5A–5C, 6A–6C, and 7A–7C show aberration curves of the optical system of the first embodiment at low, moderate, and high magnification positions, respectively.

The optical system of the first embodiment, as shown in FIG. 3, comprises an objective system 1 having a positive refracting power as a whole, a first prism 2 and second prism 3 arranged as an image erecting system, and an eyepiece system 4. Each of the first and second prisms 2 and 3 is such that its optical path length is very great, its sectional aspect ratios vary greatly, and a low-hygroscopic organic material is used, thereby lessening transient variations of optical properties. First and second prisms 2 and 3 are shown in FIG. 3 as being made of low-hygroscopic organic material by the hatching of these components. Furthermore, each of the lenses other than the first and second prisms 2, 3 is constructed so that its thickness at the middle its relatively large, its sectional aspect ratios vary, and the low-hygroscopic organic material is used, thereby lessening further the transient variations of optical properties produced by hygroscopicity.

Numerical data of the first embodiment are shown below.

Finder magnification 0.40~0.75~1.43×

Diopter −0.5 (diop)

Field angle (2ω) 55.8~29.6~15.20° r1=8.5460 d1=1.200 n1=1.58423 v1=30.49 r2=5.3511 (aspherical)

d2=2.623 r3=−15.9103 d3=1.200 n3=1.58423 v3=30.49 r4=−292.1150 (aspherical)

d4=17.1657 (low magnification), 6.5974 (moderate magnification), 0.8007 (high magnification)

r5=15.5858 (aspherical)

d5=5.000 n5=1.52540 v5=56.25 r6=−9.4527 d6=0.7959 (low magnification), 6.3260 (moderate magnification), 17.1588 (high magnification)

r7=−74.3095 (aspherical)

d7=28.000 n7=1.52540 v7=56.25 r8=∞ d8=1.000 r9=19.5732 d9=26.500 n9=1.52540 v9=56.25 r10=∞ d10=2.241 r11=18.6988 d11=2.800 n11=1.49241 v11=57.66 r12=−23.6975 (aspherical)

d12=20.205 r13 (eyepoint)

Aspherical coefficients

Second surface

P=1.0000, E=0.23427×10$^{-3}$,

F=0.97945×10$^{-5}$, G=0.10076×10$^{-6}$

Fourth surface

P=1.0000, E=−0.49994×10$^{-3}$,

F=−0.10933×10$^{-4}$, G=0.10319×10$^{-5}$

Fifth surface

P=1.0000, E=−0.45282×10$^{-3}$,

F=0.31163×10$^{-5}$, G=0.49309×10$^{-6}$

Seventh surface

P=1.0000, E=−0.38875×10$^{-4}$,

F=0.22624×10$^{-5}$, G=−0.30842×10$^{-6}$

Twelfth surface

P=1.0000, E=0.71235×10$^{-4}$,

F=−0.41488×10$^{-6}$, G=0.64323×10$^{-8}$

Figure 9A:
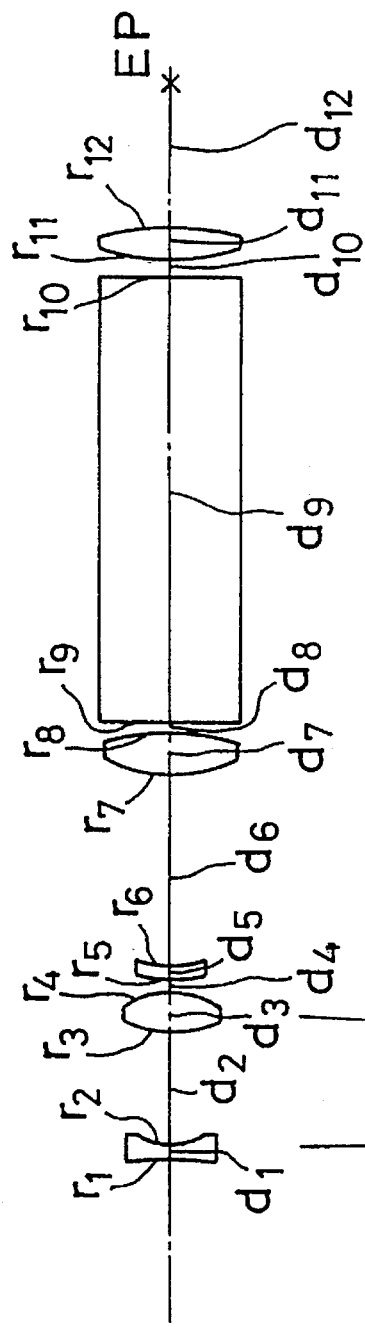
FIGS. 9A, 9B, and 9C are sectional views showing configurations of the optical system of the second embodiment developed along the optical axis at low, moderate, and high magnification positions, respectively.
Figure 9B:
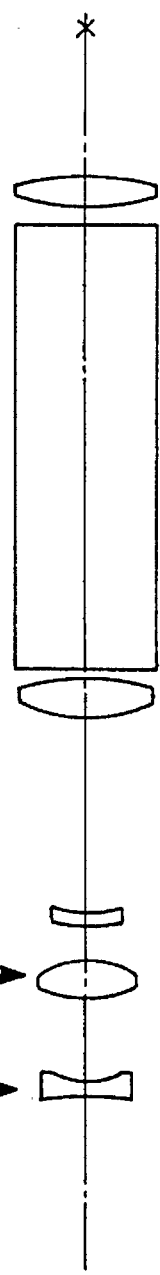
Figure 9C:
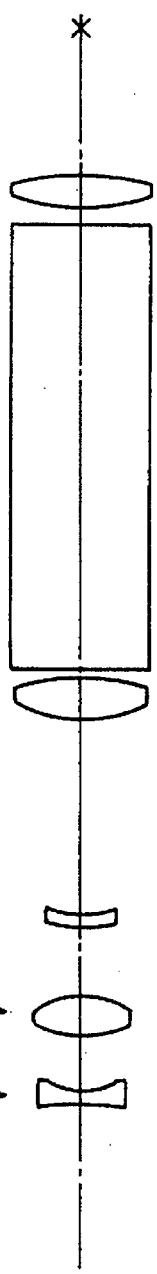
Figure 10A:
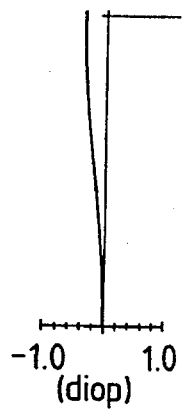
FIGS. 10A, 10B, and 10C are diagrams showing characteristics of spherical aberration, astigmatism, and distortion, respectively, at the low magnification position in the optical system of the second embodiment.
Figure 10B:
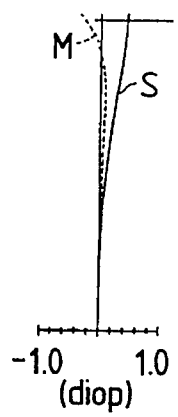
Figure 10C:
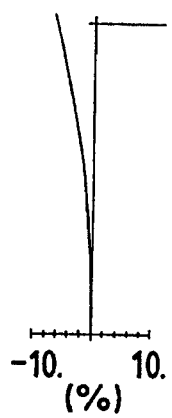
Figure 11A:
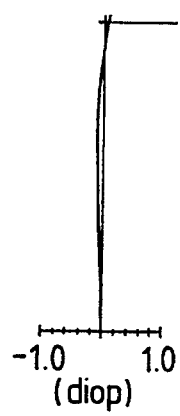
FIGS. 11A, 11B, and 11C are diagrams showing characteristics of spherical aberration, astigmatism, and distortion, respectively, at the moderate magnification position in the optical system of the second embodiment.
Figure 11B:
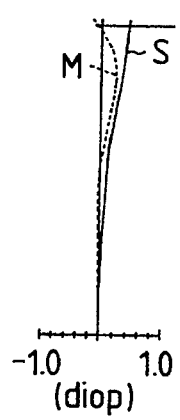
Figure 11C:
Figure 12A:
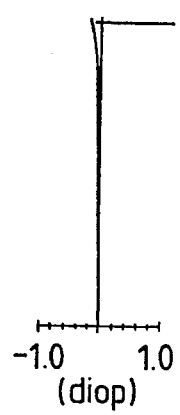
FIGS. 12A, 12B, and 12C are diagrams showing characteristics of spherical aberration, astigmatism, and distortion, respectively, at the high magnification position in the optical system of the second embodiment.
Figure 12B:
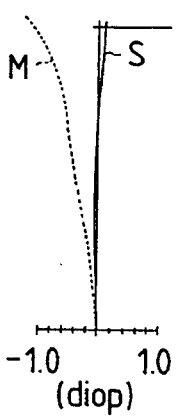
Figure 12C:
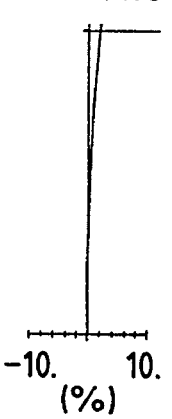

FIG. 8 shows the lens arrangement of the optical system of the second embodiment in the present invention. FIGS. 9A–9C show configurations, at low, moderate, and high magnification positions, respectively, developed along the optical axis of the optical system in FIG. 8. FIGS. 10A–10C, 11A–11C, and 12A–12C show aberration curves of the optical system of the second embodiment at low, moderate, and high magnification positions, respectively.

The optical system of the second embodiment, as depicted in FIG. 8, includes the objective system 1 of positive power, a roof mirror 5 and the first prism 2 for inverting an image, and the eyepiece system 4. The first prism 2 is such that the optical path length is very great and the aspect ratios vary considerably. Moreover, the first prism 2 is constructed of the low hygroscopic material and thereby the transient variations of optical properties produced by hygroscopicity can be reduced. First prism 2 is shown hatched in FIG. 8 indicating that it is made of low-hygroscopic organic material.

Numerical data of the second embodiment are shown below.

Finder magnification 0.35~0.46~0.64×

Diopter −0.5 (diop)

Field angle (2ω) 55.5~41.6~29.6° r1=−23.4731 d1=1.000 n1=1.58423 v1=30.49 r2=4.8006 (aspherical)

d2=8.0275 (low magnification), 5.8273 (moderate magnification), 3.8581 (high magnification)

r3=6.0446 (aspherical)

d3=2.965 n3=1.49241 v3=57.66 r4=−6.1606 d4=0.9954 (low magnification), 2.5452 (moderate magnification), 5.0819 (high magnification)

r5=16.3537 d5=1.000 n5=1.58423 v5=30.49 r6=6.0935 (aspherical)

d6=14.000 r7=11.8939 d7=2.806 n7=1.49241 v7=57.66 r8=−22.1551 d8=1.000 r9=∞ d9=32.500 n9=1.52540 v9=56.25 r10=∞ d10=1.971 r11=17.2118 (aspherical)

d11=2.004 n11=1.49241 v11=57.66 r12=−36.2612 d12=15.000 r13 (eyepoint)

Aspherical coefficients

Second surface
P=1.0000, E=−0.14081×10⁻²,
F=0.16586×10⁻³, G=−0.11584×10⁻⁴

Third surface
P=1.0000, E=−0.20058×10⁻²,
F=0.25504×10⁻⁴, G=−0.21081×10⁻⁵

Sixth surface
P=1.0000, E=0.91304×10⁻³,
F=0.25504×10⁻⁴, G=−0.34333×10⁻⁵

Eleventh surface
P=1.0000, E=−0.90149×10⁻⁴,
F=0.33791×10⁻⁵, G=−0.76166×10⁻⁷

Figure 13A:
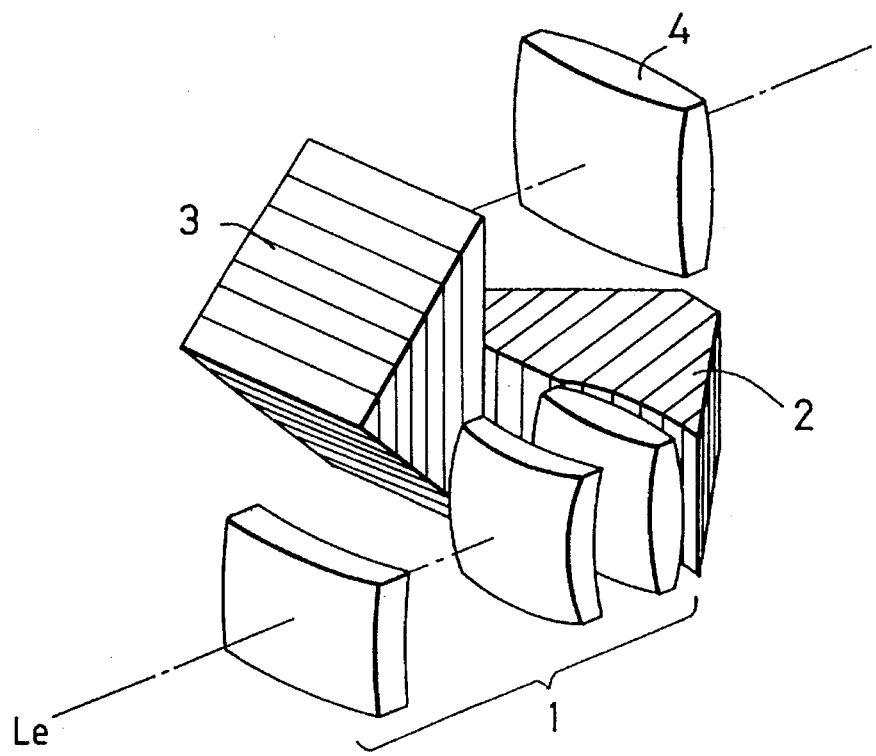
FIGS. 13A and 13B are views showing lens arrangements in ordinary and panoramic photography modes, respectively, of the optical system of a third embodiment.
Figure 13B:
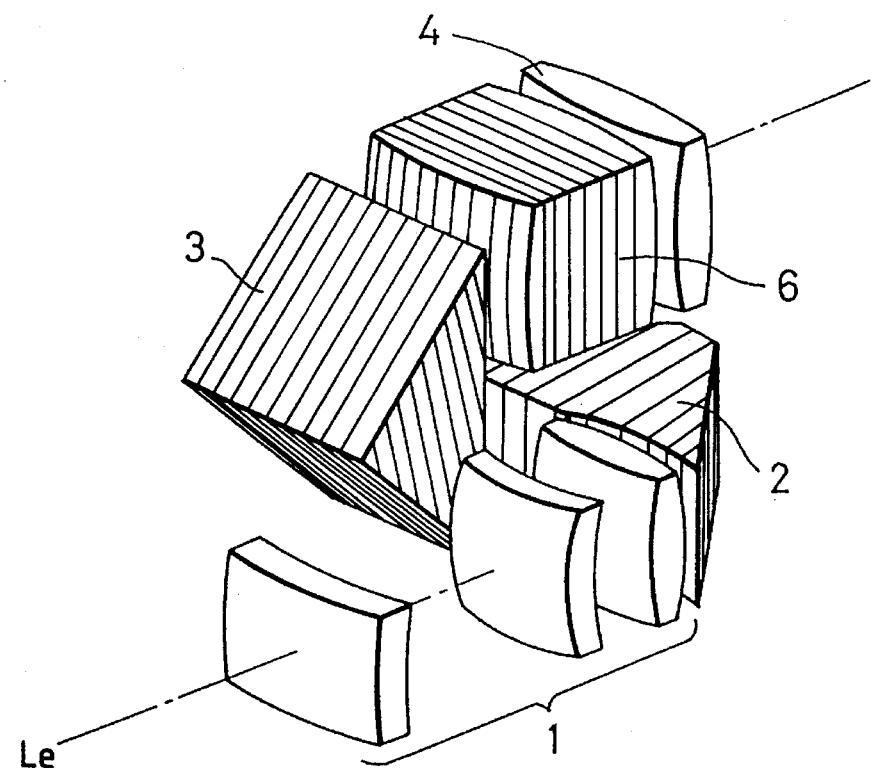
Figure 14A:
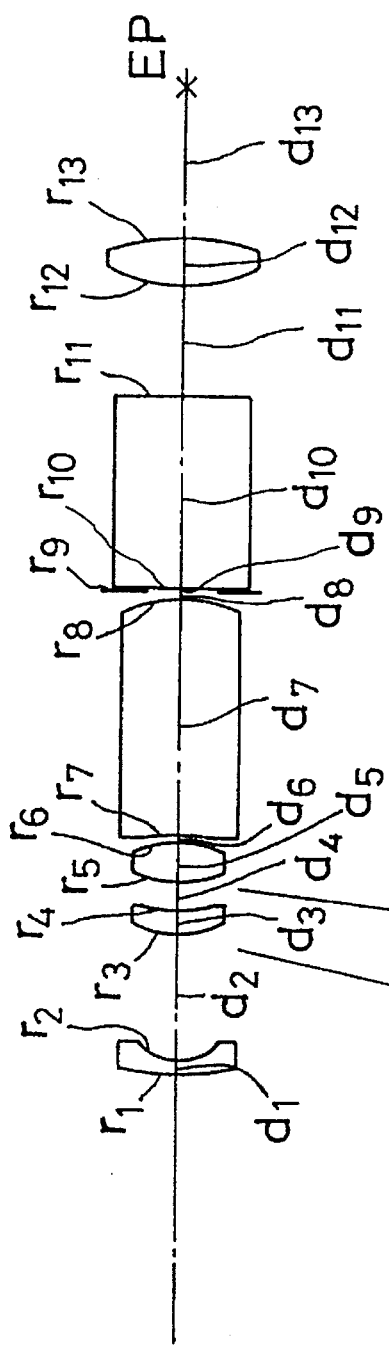
FIGS. 14A, 14B, and 14C are sectional views showing configurations of the optical system of FIG. 13A developed along the optical axis at low, moderate, and high magnification positions, respectively.
Figure 14B:
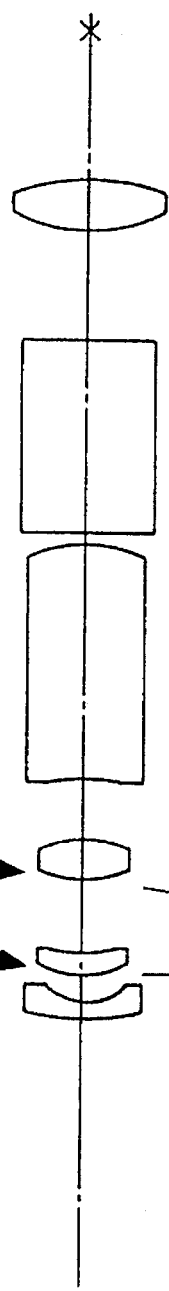
Figure 14C:
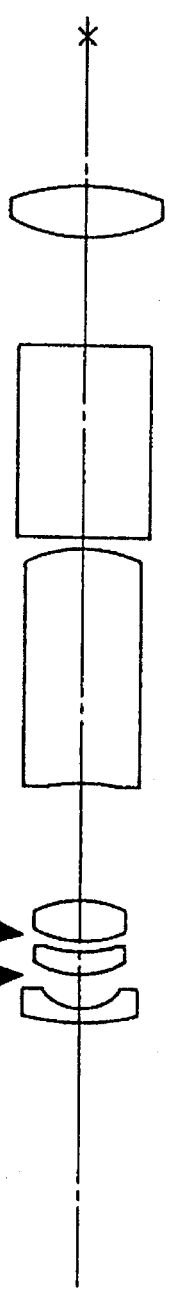
Figure 15A:
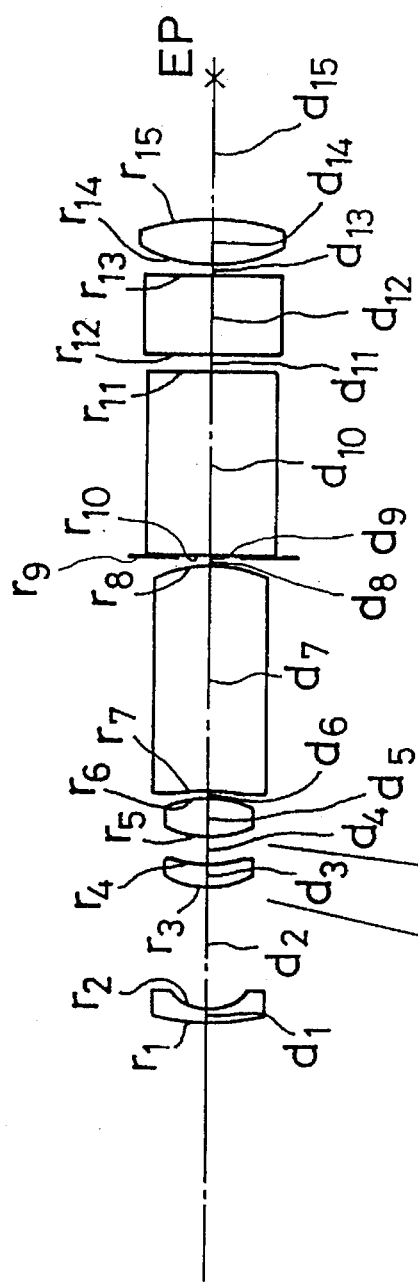
FIGS. 15A, 15B, and 15C are sectional views showing configurations of the optical system of FIG. 13B developed along the optical axis at low, moderate, and high magnification positions, respectively.
Figure 15B:
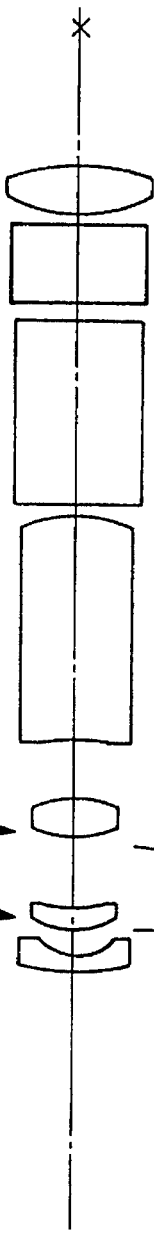
Figure 15C:
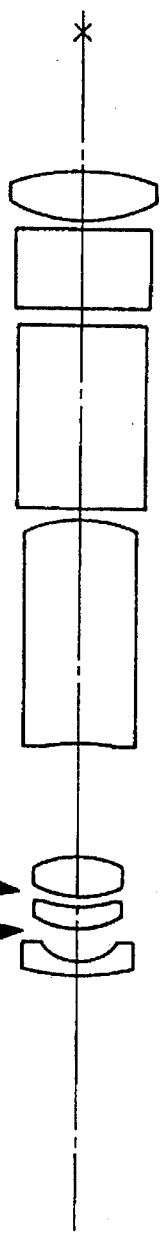
Figure 16A:
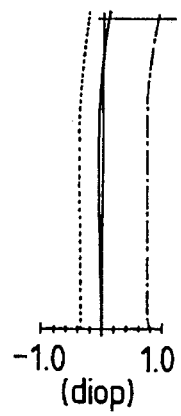
FIGS. 16A, 16B, and 16C are diagrams showing characteristics of spherical aberration, curvature of field, and distortion, respectively, at the low magnification position in the optical system of FIG. 13A.
Figure 16B:
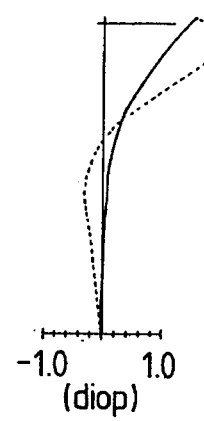
Figure 16C:
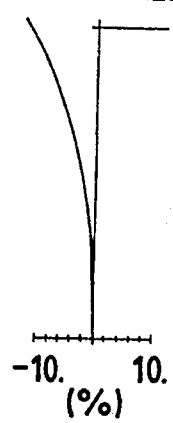
Figure 17A:
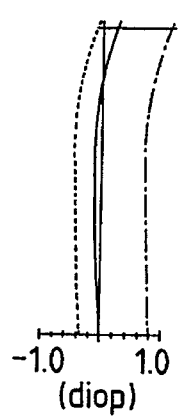
FIGS. 17A, 17B, and 17C are diagrams showing characteristics of spherical aberration, curvature of field, and distortion, respectively, at the moderate magnification position in the optical system of FIG. 13A.
Figure 17B:
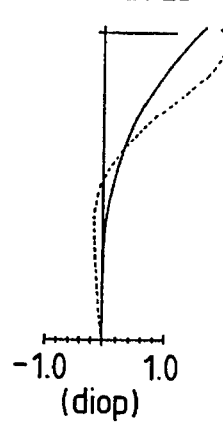
Figure 17C:
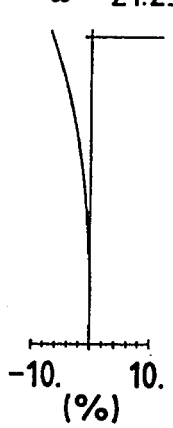
Figure 18A:
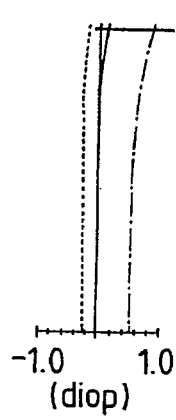
FIGS. 18A, 18B, and 18C are diagrams showing characteristics of spherical aberration, curvature of field, and distortion, respectively, at the high magnification position in the optical system of FIG. 13A.
Figure 18B:
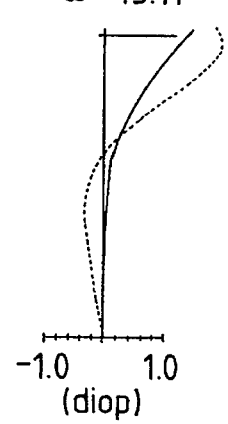
Figure 18C:
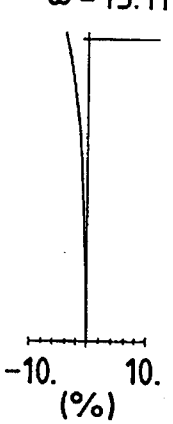
Figure 19A:
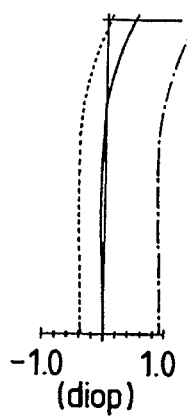
FIGS. 19A, 19B, and 19C are diagrams showing characteristics of spherical aberration, curvature of field, and distortion, respectively, at the low magnification position in the optical system of FIG. 13B.
Figure 19B:
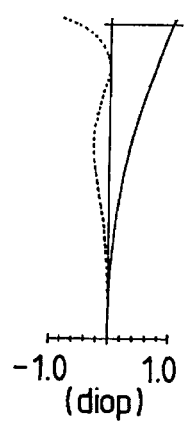
Figure 19C:
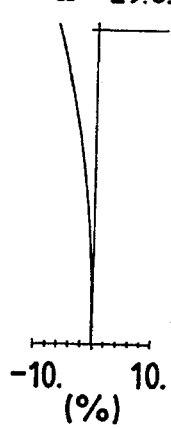
Figure 20A:
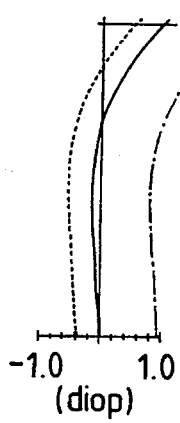
FIGS. 20A, 20B, and 20C are diagrams showing characteristics of spherical aberration, curvature of field, and distortion, respectively, at the moderate magnification position in the optical system of FIG. 13B.
Figure 20B:
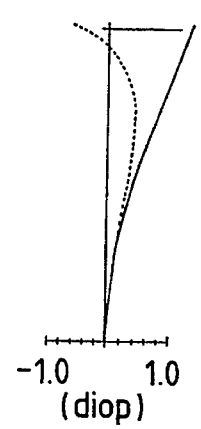
Figure 20C:
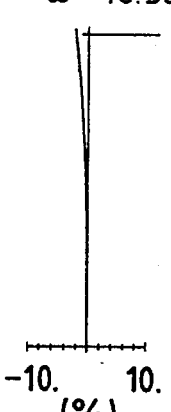
Figure 21A:
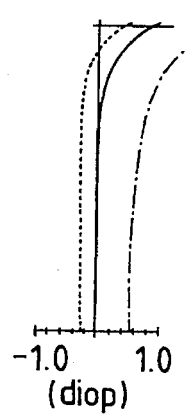
FIGS. 21A, 21B, and 21C are diagrams showing characteristics of spherical aberration, curvature of field, and distortion, respectively, at the high magnification position in the optical system of FIG. 13B.
Figure 21B:
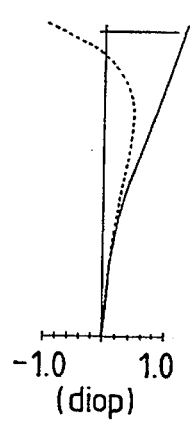
Figure 21C:
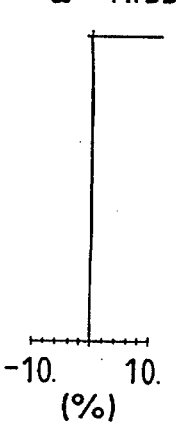

FIGS. 13A and 13B show lens arrangements in ordinary and panoramic photography modes, respectively, of the optical system of the third embodiment. FIGS. 14A–14C show configurations of the optical system of FIG. 13A developed along the optical axis. FIGS. 15A–15C show configurations of the optical system of FIG. 13B developed along the optical axis. FIGS. 16A–16C, 17A–17C, and 18A–18C show aberration curves in the ordinary photography mode of the optical system of the third embodiment at low, moderate, and high magnification positions, respectively. FIGS. 19A–19C, 20A–20C, and 21A–21C show aberration curves in the panoramic photography mode of the optical system of the third embodiment at low, moderate, and high magnification positions, respectively.

The optical system of the third embodiment in the ordinary photography mode, as shown in FIG. 13A, is constructed with the objective system 1 of positive power, the first and second prisms 2 and 3 for inverting an image, and the eyepiece system 4. The first and second prisms 2 and 3 are shown hatched in FIG. 13A, indicating that they are formed of a low-hygroscopic organic material. On the other hand, the optical system in the panoramic photography mode, as shown in FIG. 13B, has the same arrangement as that shown in FIG. 13A with the exception that an exchangeable variable-magnification lens 6 is interposed between the second prism 3 and the eyepiece system 4 to cause an increase of magnification. The exchangeable variable-magnification lens 6 in FIG. 13B is formed of a low-hygroscopic organic material, indicated by hatching, as are first and second prisms 2 and 3. Each of the first and second prisms 2 and 3 is designed to have a great optical path length and various aspect ratios of sections, and the exchangeable variable-magnification lens 6 is constructed so that the thickness is large at the middle and the sectional aspect ratios vary. Moreover, the first prism 2, the second prism 3, and the exchangeable variable-magnification lens 6 are constructed of low-hygroscopic organic materials, and thereby transient variations of optical properties produced by hygroscopicity can be reduced.

Numerical data of the third embodiment are as follows:
(Ordinary photography mode)

Finder magnification 0.33~0.54~0.87×

Diopter −0.5 (diop)

Field angle (2ω) 34.22~21.23~13.105°

Field ratio 36:24

$r_1 = 20.4672$ $d_1 = 1.000$  $n_1 = 1.58423$  $v_1 = 30.49$ $r_2 = 4.3097$ (aspherical)

$d_2 = 10.4731$ (low magnification), 2.6498 (moderate magnification), 2.5293 (high magnification)

$r_3 = 6.8967$ (aspherical)

$d_3 = 1.838$  $n_3 = 1.49241$  $v_3 = 57.66$ $r_4 = 10.1910$ $d_4 = 2.5589$ (low magnification), 5.8290 (moderate magnification), 0.9866 (high magnification)

$r_5 = 9.2564$ (aspherical)

$d_5 = 3.160$  $n_5 = 1.49241$  $v_5 = 57.66$ $r_6 = −9.9812$ $d_6 = 0.8000$ (low magnification), 5.3531 (moderate magnification), 10.3162 (high magnification)

$r_7 = −43.0721$ (aspherical)

$d_7 = 19.470$  $n_7 = 1.52540$  $v_7 = 56.25$ $r_8 = −11.8630$ $d_8 = 1.000$ $r_9 = \infty$ $d_9 = 0.000$ $r_{10} = \infty$ $d_{10} = 16.047$  $n_{10} = 1.52540$  $v_{10} = 56.25$ $r_{11} = \infty$ $d_{11} = 9.500$ $r_{12} = 15.9091$ (aspherical)

$d_{12} = 3.039$  $n_{12} = 1.49241$  $v_{12} = 57.66$ $r_{13} = −27.6806$ $d_{13} = 18.786$ $r_{14}$ (eyepoint)

Aspherical coefficients

Second surface
P=1.0000
E=−0.10844×10⁻², F=0.50237×10⁻⁴,
G=−0.93916×10⁻⁵, H=0.21804×10⁻⁶

Third surface
P=1.0000
E=0.73203×10⁻⁴, F=−0.45235×10⁻⁴,
G=0.38861×10⁻⁵, H=−0.14219×10⁻⁶

Fifth surface
P=1.0000
E=−0.50796×10⁻³, F=0.37689×10⁻⁴,
G=−0.35484×10⁻⁵, H=0.12772×10⁻⁶

Seventh surface
P=1.0000
E=−0.79767×10⁻³, F=0.10149×10⁻³,
G=−0.34151×10⁻⁵, H=0.19633×10⁻⁶

Twelfth surface
P=1.0000
E=−0.11430×10⁻³, F=0.13197×10⁻⁵,
G=−0.33726×10⁻⁷, H=−0.43895×10⁻⁹

(Panoramic photography mode)

Finder magnification 0.40~0.65~1.04×

Diopter −0.5 (diop)

Field angle (2ω) 29.85~18.58~11.53°

Field ratio 36:13

$r_1 = 20.4672$ $d_1 = 1.000$  $n_1 = 1.58423$  $v_1 = 30.49$ $r_2 = 4.3097$ (aspherical)

$d_2 = 10.4731$ (low magnification), 2.6498 (moderate magnification), 2.5293 (high magnification)

$r_3 = 6.8967$ (aspherical)

$d_3 = 1.838$  $n_3 = 1.49241$  $v_3 = 57.66$ $r_4 = 10.1910$ $d_4 = 2.5589$ (low magnification), 5.8290 (moderate magnification), 0.9866 (high magnification)

$r_5 = 9.2564$ (aspherical)

Figure 22:
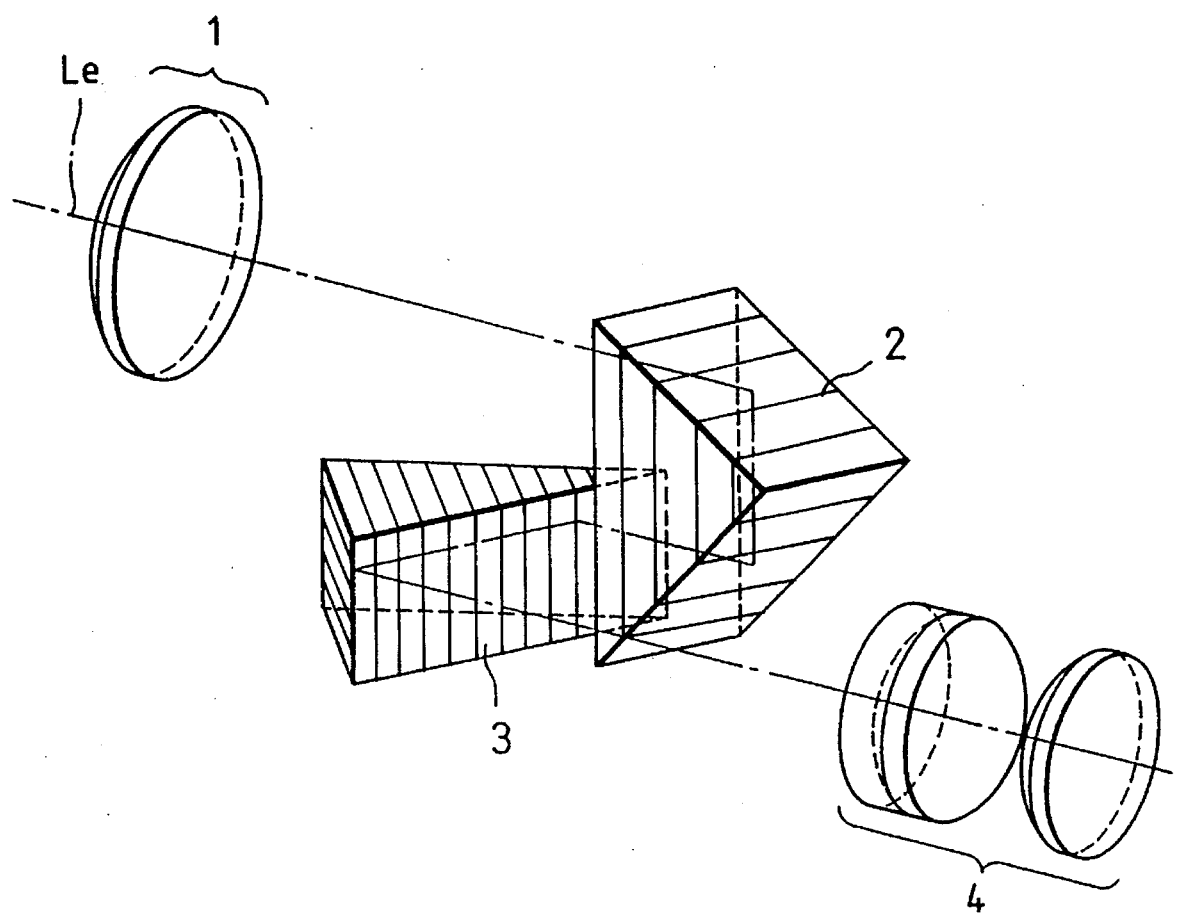
FIG. 22 is a view showing a lens arrangement of the optical system of a fourth embodiment.
Figure 23:
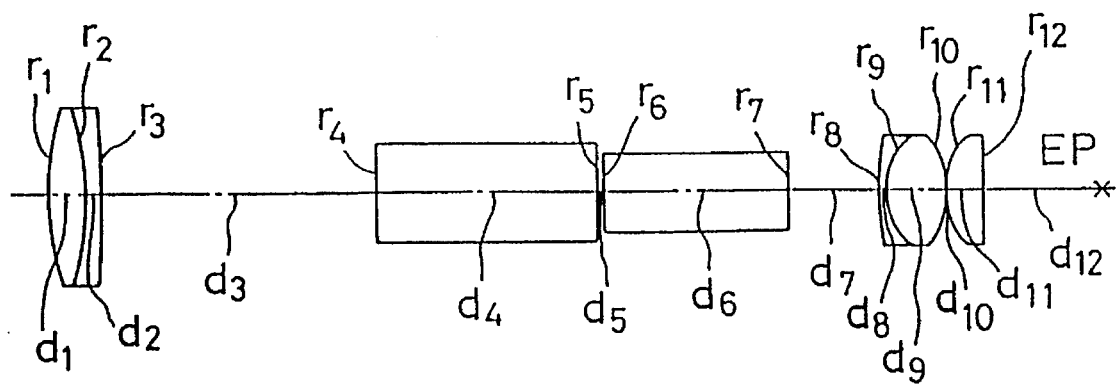
FIG. 23 is a sectional view showing the configuration of the optical system of the fourth embodiment developed along the optical axis.
Figure 24A:
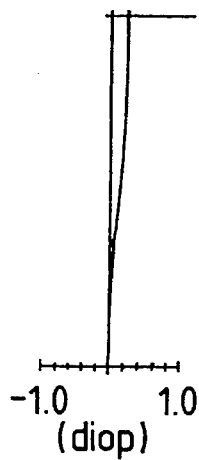
FIGS. 24A, 24B, and 24C are diagrams showing characteristics of spherical aberration, curvature of field, and distortion, respectively, of the optical system of the fourth embodiment.
Figure 24B:
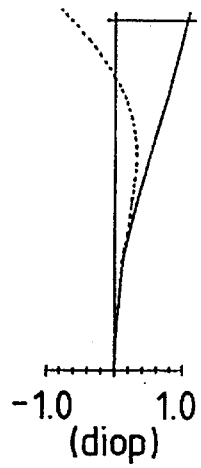
Figure 24C:
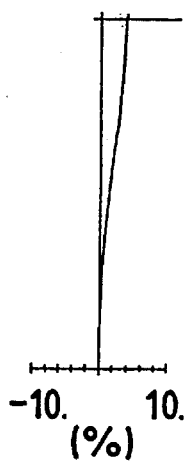

$d_5 = 3.160$  $n_5 = 1.49241$  $v_5 = 57.66$ $r_6 = −9.9812$ $d_6 = 0.8000$ (low magnification), 5.3531 (moderate magnification), 10.3162 (high magnification)

r7=–43.0721 (aspherical)
  d7=19.470 n7=1.52540 v7=56.25
r8=–11.8630
  d8=1.000
r9=∞
  d9=0.000
r10=∞
  d10=16.047 n10=1.52540 v10=56.25
r11=∞
  d11=1.000
r12=46.2290
  d12=7.200 n12=1.52540 v12=56.25
r13=–244.7050
  d13=1.300
r14=15.9091 (aspherical)
  d14=3.039 n14=1.49241 v12=57.66
r15=–27.6806
  d15=17.286
r16 (eyepoint)
Aspherical coefficients
  Second surface
    P=1.0000
    E=–0.10844×10$^{-2}$, F=0.50237×10$^{-4}$,
    G=–0.93916×10$^{-5}$, H=0.21804×10$^{-6}$
  Third surface
    P=1.0000
    E=0.73203×10$^{-4}$, F=–0.45235×10$^{-4}$,
    G=0.38861×10$^{-5}$, H=–0.14219×10$^{-6}$
  Fifth surface
    P=1.0000
    E=–0.50796×10$^{-3}$, F=0.37689×10$^{-4}$,
    G=–0.35484×10$^{-5}$, H=0.12772×10$^{-6}$
  Seventh surface
    P=1.0000
    E=–0.79767×10$^{-3}$, F=0.10149×10$^{-3}$,
    G=–0.34151×10$^{-5}$, H=0.19633×10$^{-6}$
  Fourteenth surface
    P=1.0000
    E=–0.11430×10$^{-3}$, F=0.13197×10$^{-5}$,
    G=–0.33726×10$^{-7}$, H=–0.43895×10$^{-9}$ FIG. 22 shows the lens arrangement of the optical system of the fourth embodiment in the present invention. FIG. 23 shows the configuration of the optical system of FIG. 22 developed along the optical axis. FIGS. 24A–24C show aberration curves of the optical system of the fourth embodiment.

The optical system of the fourth embodiment, as depicted in FIG. 22, includes the objective system 1 of positive power, the first and second prisms 2 and 3 for inverting an image, and the eyepiece system 4. Each of the first and second prisms 2, 3 is designed to have a great optical path length and various aspect ratios. Moreover, the first and second prisms 2 and 3 are constructed of low-hygroscopic organic materials, as indicated by the hatching of these elements in FIG. 22, and thereby transient variations of optical properties produced by hygroscopicity can be diminished. Also, the optical system of the fourth embodiment constitutes binoculars.

Numerical data of the fourth embodiment are shown below.

Field angle (2ω) 26.3°
r1=43.6800
  d1=5.000 n1=1.51633 v1=64.15
r2=–39.7600
  d2=2.2000 n2=1.62004 v1=36.25
r3=–87.7600
  d3=37.5886
r4=∞
  d4=36.6200 n4=1.52540 v4=56.25
r5=∞
  d5=1.000
r6=∞
  d6=26.0000 n6=1.52540 v6=56.25
r7=∞
  d7=12.7600
r8=66.8500
  d8=1.2000 n8=1.80518 v8=25.43
r9=9.3700
  d9=8.1000 n9=1.58913 v9=61.18
r10=–13.1800
  d10=0.2300
r11=10.4500
  d11=5.0000 n11=1.51633 v11=64.15
r12=–471.5600
  d12=11.0000
r13 (eyepoint)

In each embodiment described above, r1, r2, ... represent radii of curvature of individual lens surfaces; d1, d2 ... thicknesses of individual lenses or spaces therebetween; n1, n2 ... refractive indices of individual lenses; and v1, v2 ... Abbe's numbers of individual lenses.

Also, the configurations of aspherical surfaces in each embodiment are expressed by the following equation using the aspherical coefficients:

$$X=(Y^2/r)/[1+\{1-P(Y/r)^2\}^{1/2}]+EY^4+FY^6+GY^8+HY^{10}$$

where X is the coordinate in the direction of the optical axis, Y is the coordinate in the direction normal to the optical axis, r is the curvature of radius on the optical axis, P is the conic constant, and E, F, G, and H are aspherical coefficients.

What is claimed is:

1. A finder optical system comprising, in order from an object side thereof:

an objective system;

an image erecting system for erecting an object image formed by said objective system; and an eyepiece system for conducting said object image to an eyepoint so that said object image can be observed by an observer's eye;

at least one of said objective system, said image erecting system, and said eyepiece system including at least one optical element which is relatively thick at a middle portion thereof, and has a width and a height that differ from one another in size at a section thereof perpendicular to an optical axis of said finder optical system, said at least one optical element being formed of at least one low-hygroscopic organic material, said at least one optical element satisfying the following condition:

$$-5.00\times10^{-6}/\% \leq \alpha \leq 5.00\times10^{-6}/\%$$

where α is a linear hygroscopic expansion coefficient of said at least one optical element relative to a change per unit percentage of humidity.

2. An optical system comprising:

a photographic objective lens;

a finder objective lens disposed substantially parallel to said photographic objective lens;

image erecting means for erecting an image formed by said finder objective lens; and an eyepiece disposed to an image side of said image erecting means;

at least one of said finder objective lens, said image erecting means, and said eyepiece including at least one optical element which is relatively thick at a middle portion thereof, and has a width and a height that differ from one another in size at a section thereof perpendicular to an optical axis of said finder optical system, said at least one optical element being formed of at least one low-hygroscopic organic material and satisfying the following condition $$-5.00 \times 10^{-6}/\% \leq \alpha \leq 5.00 \times 10^{-6}/\%$$

where $\alpha$ is a linear hygroscopic expansion coefficient of said at least one optical element relative to a change per unit percentage of humidity.

3. A finder optical system according to claim 1, wherein:

said at least one optical element includes a lens.

4. A finder optical system according to claim 1, wherein:

said at least one optical element includes a prism.

5. A finder optical system according to claim 1, wherein:

said at least one optical element includes an interface covered with one of a coating and paint.

6. An optical system according to claim 1 or 2, wherein:

said at least one low-hygroscopic organic material includes polyolefin resin.

7. A finder optical system comprising, in order from an object side thereof:

an objective system;

an image erecting system for erecting an object image formed by said objective system, said image erecting system being relatively thick at an axial portion thereof, said image erecting system having a width and a height different from said width, and said image erecting system including at least one optical element formed of at least one low-hygroscopic organic material and satisfying the following condition:

$$-5.00 \times 10^{-6}/\% \leq \alpha \leq 5.00 \times 10^{-6}/\%$$

where $\alpha$ is a linear hygroscopic expansion coefficient of said at least one optical element relative to a change per unit percentage of humidity; and an eyepiece system for conducting said object image to an eyepoint so that said object image can be observed by an observer's eye.

8. A finder optical system according to claim 7, wherein:

said at least one optical element includes a lens.

9. A finder optical system according to claim 7, wherein:

said at least one optical element includes a prism.

10. A finder optical system according to claim 7, wherein:

said at least one optical element is anisotropically shaped.

* * * * *